United States Patent
Piazza (10) Patent No.: US 12,176,979 B2
(45) Date of Patent: Dec. 24, 2024

(54) COMMUNICATION SYSTEM AND METHOD FOR SELECTING A RADIATION PATTERN ASSOCIATED WITH A COMMUNICATION SYSTEM

(71) Applicant: Adant Technologies, Inc., Wilmington, DE (US)

(72) Inventor: Daniele Piazza, Padua (IT)

(*) Notice: Subject to any disclaimer, the term of this patent is extended or adjusted under 35 U.S.C. 154(b) by 0 days.

(21) Appl. No.: 17/906,859

(22) PCT Filed: Mar. 23, 2021

(86) PCT No.: PCT/IB2021/052407
§ 371 (c)(1),
(2) Date: Sep. 20, 2022

(87) PCT Pub. No.: WO2021/191799
PCT Pub. Date: Sep. 30, 2021

(65) Prior Publication Data
US 2023/0179275 A1   Jun. 8, 2023

(30) Foreign Application Priority Data
Mar. 24, 2020 (IT) .................. 102020000006229

(51) Int. Cl.
*H04B 7/06* (2006.01)
*H01Q 3/24* (2006.01)
*H01Q 25/00* (2006.01)

(52) U.S. Cl.
CPC ............. *H04B 7/0617* (2013.01); *H01Q 3/24* (2013.01); *H01Q 25/001* (2013.01)

(58) Field of Classification Search
CPC ...... H01Q 25/001; H01Q 3/24; H04B 7/0617; H04B 7/0695; H04B 7/088; H04W 16/28
See application file for complete search history.

(56) References Cited

U.S. PATENT DOCUMENTS 6,496,142 B1   12/2002   Iinuma
9,263,798 B1   2/2016    Piazza et al.
(Continued)

FOREIGN PATENT DOCUMENTS

EP   2641294      9/2013
WO   2016011199   1/2016

OTHER PUBLICATIONS

Savazzi Stefano et al., Pattern reconfigurable antennas for passive motion detection: WiFi test-bed and first studies, 2019 IEEE 30th Annual International Symposium on Personal, Indoor and Mobile Radio Communications, IEEE, Sep. 8, 2019, pp. 1-6—The whole document.

*Primary Examiner* — Aristocratis Fotakis
(74) *Attorney, Agent, or Firm* — Themis Law (57) ABSTRACT

A communication system includes a plurality of radio chains, each configured to generate an electrical signal having a predetermined frequency that is distinct that of the other radio chains. One or more antennas are connected to the plurality of radio chains to emit and/or receive an electromagnetic signal with a frequency corresponding to that of the electrical signal generated by the radio chains, and an electronic selection circuit has inputs connected to the radio chains and one or more outputs connected to the antennas, which are configured to selectively emit the electromagnetic signal associated with each radio chain according to distinct and different radiation patterns. The electronic circuit controls the antennas to select a radiation pattern associated with the corresponding electrical signal generated by the radio chains, which is associated with the electrical signal of a given radio chain varies according to the radiation pattern selected for the electrical signal of one or more of the other radio chains distinct from the radio chain. A method (Continued)

LEGEND:
1: Communication system
2, 2': Radio chains
3: Antenna
4: Electronic selection circuit
5: Input
6: Output
7: Processing unit
8: Switching element for selecting a radiation pattern associated with the antennas of a communication system.

6 Claims, 3 Drawing Sheets

(56) References Cited

U.S. PATENT DOCUMENTS

| | | | |
|---|---|---|---|
| 2018/0091257 A1* | 3/2018 | Steele | H04L 1/0003 |
| 2019/0253901 A1* | 8/2019 | Desclos | H04B 7/0617 |
| 2019/0349783 A1* | 11/2019 | Barker | H04W 16/28 |
| 2019/0391620 A1* | 12/2019 | Matsuo | G06F 1/1683 |
| 2020/0068494 A1* | 2/2020 | Wen | H04W 72/046 |
| 2021/0109145 A1* | 4/2021 | Haustein | G01R 29/0871 |
| 2021/0143875 A1* | 5/2021 | Svendsen | H04B 7/0456 |
| 2021/0143921 A1* | 5/2021 | Nasrullah | H04B 17/14 |
| 2022/0022071 A1* | 1/2022 | Leather | H04B 7/0452 |

* cited by examiner

LEGEND:

A, B, C, A', A": Radiation patterns

FIG. 3

LEGEND:

a): Preparation of a plurality of sets of radiation patterns
b): Univocal association of each set with a radio chain
c): Association of parameters with antenna signals
d): Determination of predetermined reference values
e): Assessment of parameters defined in step c)
f): Execution of step e) for all radiation patterns
g): Selection of parameters with closest values to reference values
h): Association of antennas with parameters selected in step g)
i): Association of antennas with radiation patterns
l): Preparation of subsets of radiation patterns
m): Association of radiation patterns with radio chains
o): Definition of additional parameter with quantity of real-time data traffic
p): Measurement of additional parameter

FIG. 4

COMMUNICATION SYSTEM AND METHOD FOR SELECTING A RADIATION PATTERN ASSOCIATED WITH A COMMUNICATION SYSTEM

FIELD OF APPLICATION OF THE INVENTION

The present invention can be applied in the technical sector of data communications through the propagation of radio signals and concerns a communication system suited to transmit and/or receive radio signals.

The subject of the invention furthermore includes a method for selecting the radiation diagram associated with a communication system.

STATE OF THE ART

The use of electronic transmitter and receiver devices (generally referred to as radio chains) is known in the sector of telecommunications and radio data transmission, said devices being configured to operate with signals whose band width is centred on a precise frequency.

More specifically, each chain can be constituted by transmitter and/or receiver devices, antennas, filters, and other similar equipment specifically designed to manage signals with fixed and predetermined frequency and bandwidth.

The communication systems designed to transmit and/or receive signals centred on different frequencies are provided with a suitable number of radio chains which operate completely independently of one another, since each chain is configured to manage signals having a single frequency.

In some applications of these systems several antennas associated with the same radio chain are used.

In this way, in fact, it is possible to dynamically change the overall radiation pattern associated with the communication system, since the operation of each antenna can be controlled in an "intelligent" manner; these systems are commonly referred to as smart antennas.

The radio chain of a configuration of smart antennas includes the use of an electronic circuit positioned directly upstream of the antennas and suited to provide the latter with respective control signals capable of varying their electrical transmission/reception configuration.

For example, the control signal can be able to selectively vary the scattering parameters of each single antenna associated with that specific radio chain.

In this way, the radiation pattern of the single antenna will vary according to the control signal supplied to the same.

The electronic unit is configured to conveniently control all the control signals sent to the antennas, in such a way as to generate an overall pattern emitted by the latter in compliance with the design requirements (for example in terms of directivity values, power values, etc.).

Even the radio chains designed to manage smart antennas are optimized in such a way that they are autonomous and independent of one another: the electronic circuits and all the antennas associated with a chain centred on a specific frequency are not shared and do not interfere in any way with those used in a chain centred on different frequencies.

This configuration offers the indisputable advantage of minimizing the interference but however has some important drawbacks.

In particular, the overall number of antennas used in a system provided with several radio chains is rather large and this creates many problems related to the occupied space for any designer wanting to actually carry out this type of equipment.

The fact that the various radio chains are independent of one another increases the overall number of antennas used in the equipment, since each chain requires a predetermined set of dedicated antennas.

The large number of antennas used in this kind of equipment increases also the overall cost of the latter, since it becomes more difficult to design the equipment and a large number of components is required for its production.

In order to overcome these drawbacks, apparatuses provided with a single set of antennas have been developed, said antennas being intended to be shared by all the radio chains used in said apparatuses.

In this case, therefore, the antennas provided in the apparatus are suited to emit and receive radio signals with different frequencies, generated by the various chains to which they are connected.

In order to regulate the supply of signals to the antennas, passive electronic devices such as diplexers or other similar components are generally used, said devices being provided with a plurality of inputs connected to the radio chains of the apparatus and with one or more outputs connected to the set of antennas.

The apparatuses using the same set of antennas for all the signals with different frequency generated by the radio chains of the device make it possible to occupy less space and are less expensive than the apparatuses made up of radio chains and provided with dedicated antennas operating in a completely independent manner.

However, the quality and performance of these apparatuses are lower than those of the first type and in addition the level of interference between signals with different frequency is often unsatisfactory, so that these factors considerably limit the use of this configuration.

The patent documents EP 2 641 294 and U.S. Pat. No. 9,263,798 describe communication systems which are provided with a single set of antennas and suited to emit electromagnetic signals centred on distinct frequencies, each associated with distinct radio chains. However, these systems have the same drawbacks mentioned in the previous paragraph with reference to the known communication systems.

PRESENTATION OF THE INVENTION

The present invention intends to overcome the technical drawbacks mentioned above by providing a communication system.

In particular, the main object of the present invention is to provide a communication system which makes it possible to minimize the space occupied by the communication equipment.

It is a further object of the present invention to provide a communication system which makes it possible to minimize the production costs of the communication equipment.

It is another object of the present invention to provide a communication system which is highly flexible and thus makes it possible to optimize the configuration of the communication equipment in any operating condition.

It is a further object of the present invention to provide a communication system which features high frequency insulation and minimizes the risk of interference between the various signals emitted and/or received by the antennas.

It is another object of the present invention to provide a communication system which is simple to implement and reduces the time necessary for designing the communication equipment.

Again, it is not the least object of the present invention to provide a communication system which can be easily implemented using electronic components commonly available on the market.

These and other objects which are clarified in greater detail below are achieved by a communication system of the type according to claim 1.

Other objects which are described in greater detail below are achieved by a communication system according to the related dependent claims.

Another aspect of the present invention concerns a method for selecting a radiation pattern associated with one or more antennas of a communication system as disclosed hereinafter.

BRIEF DESCRIPTION OF THE DRAWINGS

The advantages and characteristics of the present invention clearly emerge from the following detailed description of some preferred but non-limiting embodiments of a method for selecting an operating configuration for antennas and of a communication system, with special reference to the following drawings, wherein.

DETAILED DESCRIPTION OF THE INVENTION

The subject of the present invention is a communication system designed to transmit and/or receive radio signals between a source and a receiver.

Figure 1:
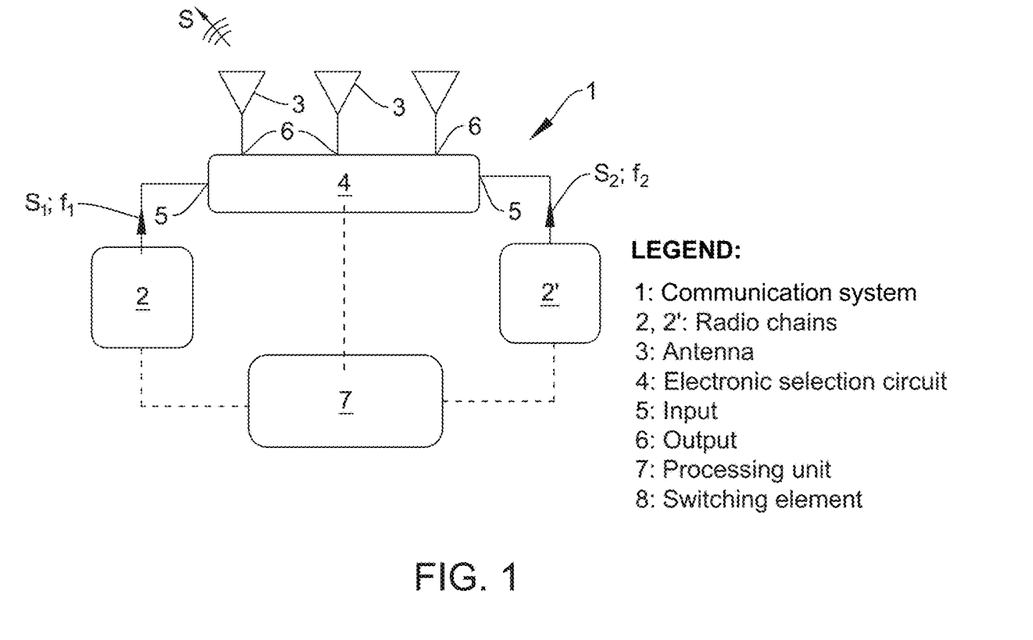
FIG. 1 shows a block diagram of a communication system according to the invention.

FIG. 1 schematically shows a communication system according to the invention, which here below is indicated by the reference number 1.

This system comprises a plurality of radio chains 2, 2', each one of which is configured to generate an electrical signal $s_1$, $s_2$ with a predetermined frequency $f_1$, $f_2$.

More specifically, further on in this description the expression "radio chain" refers to a cascade of electronical devices suited to generate and/or process signals having a predetermined frequency and intended to be emitted and/or received by an antenna.

For example, the radio chains frequently used in the field of telecommunications include a plurality of devices known per se (for example, signal generators, filters, phase shifters, modulators etc.) and suited to generate or receive signals with a frequency spectrum included in the RF band (approximately from 30 Hz to 300 GHz).

The signal $s_1$ generated and/or processed by a radio chain 2 of the system 1 has a frequency $f_1$ which is distinct from the frequency $f_2$ of the signal $s_2$ generated and/or processed by the other radio chains 2' of the same system 1.

In the diagram shown in FIG. 1 there are two radio chains 2, 2' (schematically represented by two rectangular blocks) which are suited to generate and/or process electrical signals $s_1$, $s_2$ with frequencies $f_1$, $f_2$ different from each other $f_1$, $\neq f_2$.

The system 1 comprises at least one antenna 3 connected to the plurality of radio chains 2, 2'. This at least one antenna 3 is configured to emit and/or receive an electromagnetic signal S associated with the signal $s_1$, $s_2$ generated and/or processed by the radio chains 2, 2' and having therefore a frequency $f_1$, $f_2$.

In the example of FIG. 1 there are three antennas 3 operatively connected to the pair of radio chains 2, 2'.

Conveniently, each antenna 3 is configured to selectively emit the electromagnetic signal S associated with the respective radio chains 2, 2' according to a plurality of different and distinct radiation patterns.

As is known, the radiation patterns of the antennas can be selectively modified due to the variations associated with the currents which are generated at the level of the radiating elements of the antenna following the application of an electrical signal.

Even a single antenna fed by a monochrome signal can thus modify its radiation pattern if said signal is such as to alter the antenna currents.

In the case of a system comprising several antennas (typically an array of antennas in the MIMO configuration), the overall radiation pattern can be modified by activating/deactivating one or more antennas of the array.

More specifically, by maintaining the signal that feeds the array of antennas constant, it is possible to modify the overall radiation pattern by conveniently selecting those antennas of the array which are active (that is, electrically connected to the circuit and suited to receive or transmit a signal) and those which, on the contrary, remain substantially inactive (that is, isolated from the circuit) and behave as passive elements.

Furthermore, the overall radiation pattern of an array of antennas can vary also according to the way in which the signals are supplied to the respective antennas of the array.

Figure 2:
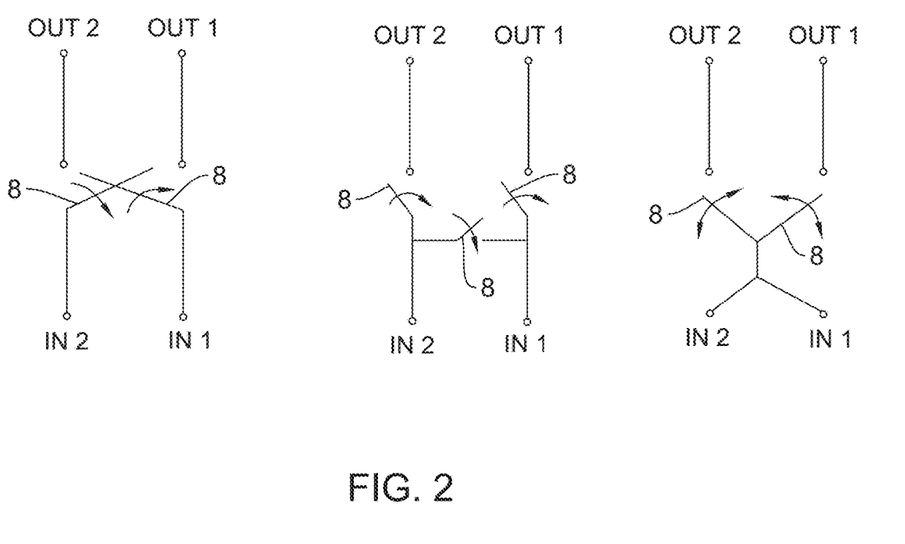
FIG. 2 shows some simplified circuit diagrams of electronic circuits used in the system illustrated in FIG. 1.

The schematic representation of FIG. 2 can clarify this aspect, as it shows a system in which two signals with distinct frequency $f_1$, $f_2$ are constantly applied to the respective inputs IN1 and IN2, and there is one pair of outputs OUT1 and OUT2 which can be connected to two respective antennas 3.

As can be seen in the configurations I-V, between the inputs IN1, IN2 and the outputs OUT1, OUT2 it is possible to apply convenient switching elements 8 and connections suited to define how the signals $f_1$, $f_2$ are distributed within the circuit.

Conveniently, the switching elements 8 can be constituted by diodes and capacitors or by integrated circuits selectively controlled by a control circuit (not shown).

In diagram I, the signals $f_1$ and $f_2$ can be selectively or simultaneously applied to the corresponding outputs OUT1 and OUT2.

In diagram II, instead, it is possible to carry out a selective inversion of the feeding of the antennas 3, as the signal $f_1$ can be applied to the output OUT2 (while the other output OUT1 is inactive) or the signal $f_2$ can be applied to the output OUT1 (while the other output OUT2 is inactive).

In diagram III, a signal generated by the overlapping of signals $f_1$, $f_2$ (that is, a signal $f_1+f_2$) can be selectively or simultaneously applied to the outputs OUT1 and OUT2.

It can be easily observed that the radiation patterns associated with the antennas 3 connected to the outputs OUT1 and OUT2 are different in the case where the same are fed according to one of diagrams I, II, III.

Consequently, for each radio chain 2, 2' the antennas 3 are able to transmit and/or receive an electromagnetic signal according to radiation patterns which have been defined during the design stage.

Figure 3:
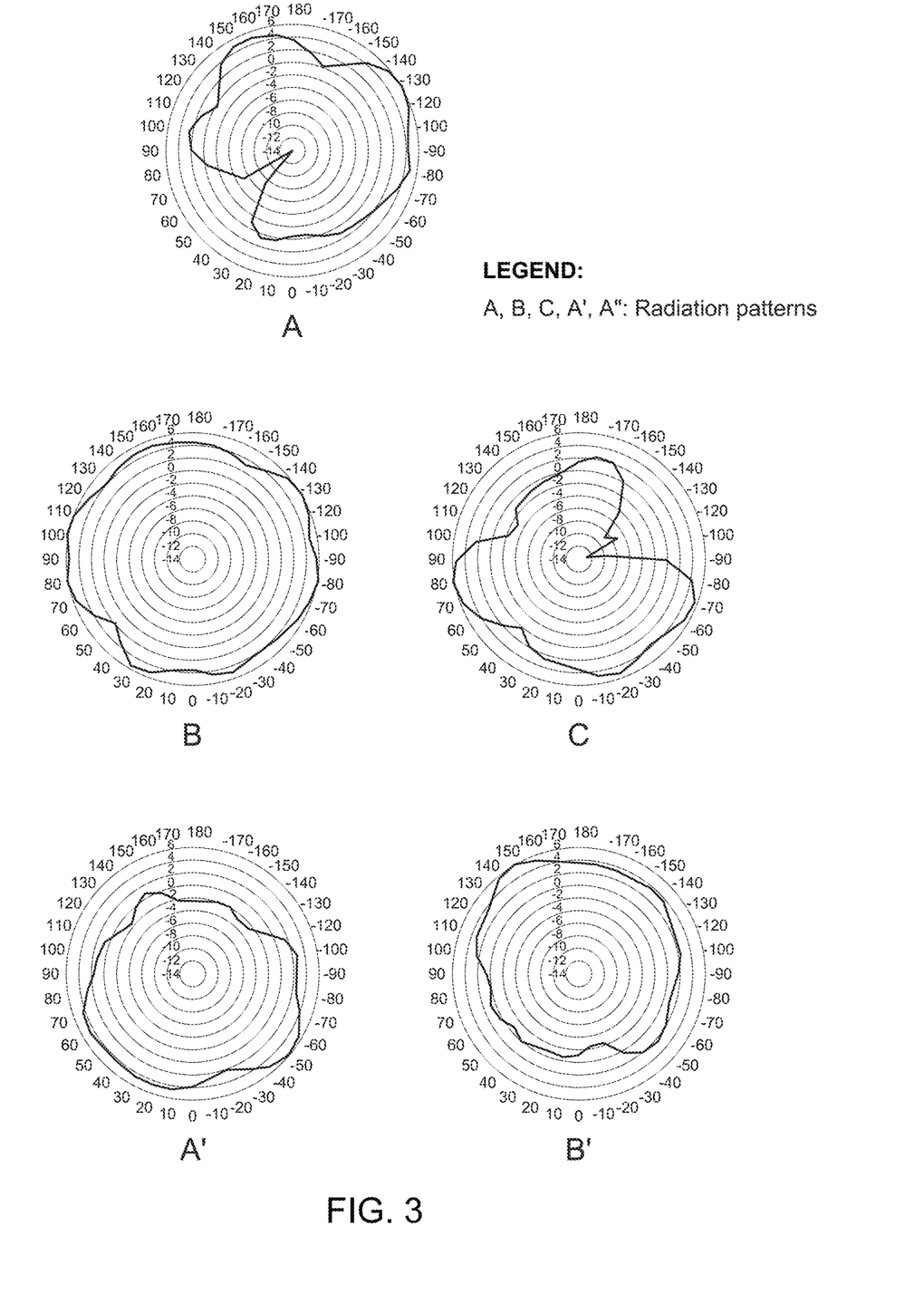
FIG. 3 shows some radiation patterns associated with the antennas of the system of FIG. 1.
Figure 4:
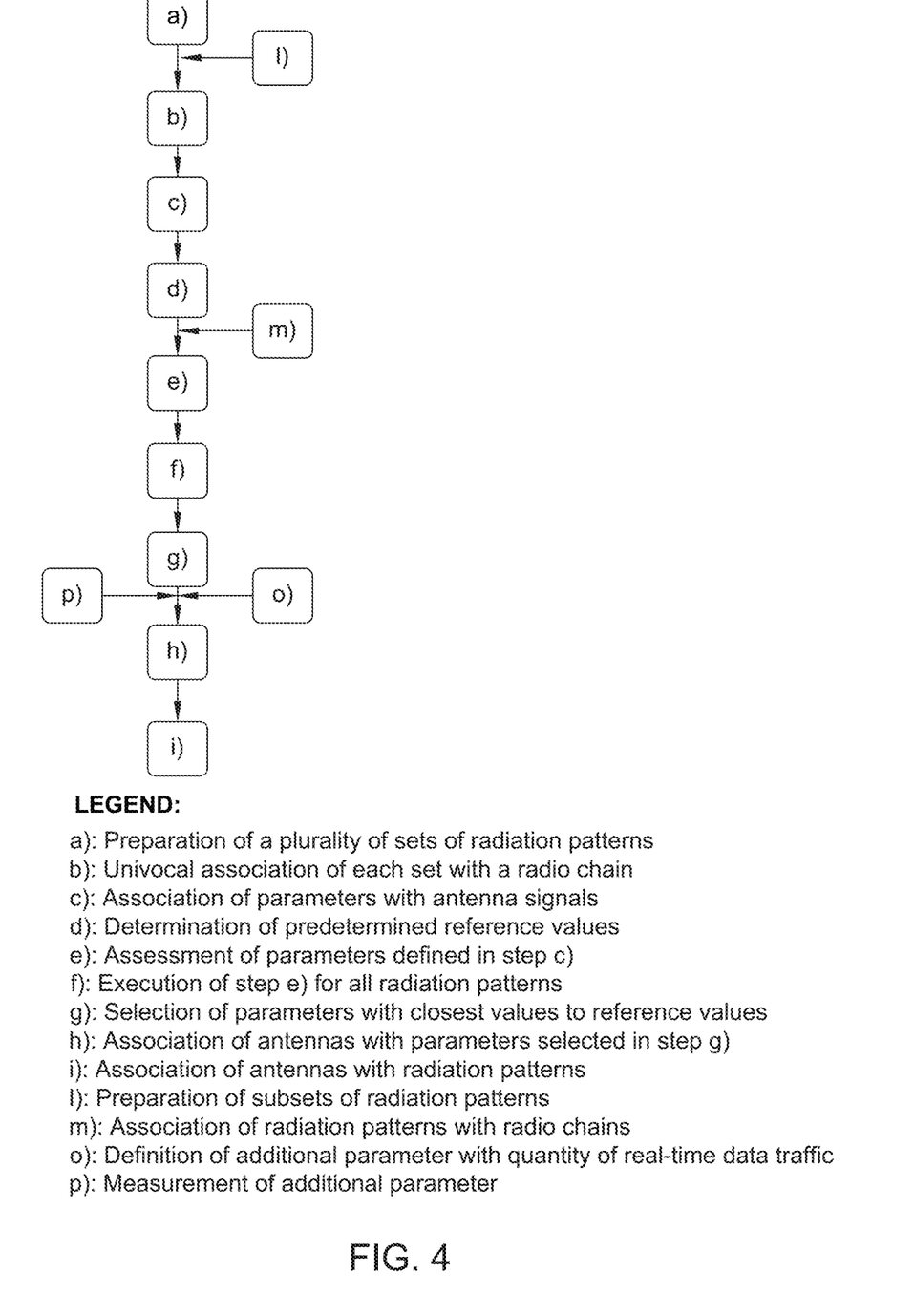
FIG. 4 shows a block diagram of a method for selecting a radiation patterns associated with the antennas of a communication system.

In order to better clarify this aspect, FIG. 3 shows some radiation patterns suited to define the overall behaviour of the three antennas 3 used in the system shown in FIG. 1.

More specifically, the first line shows the radiation patterns which can be selected when the antennas emit or receive a signal with frequency $f_1$ (associated with the radio chain 2).

In other words, a signal with frequency $f_1$ can be transmitted according to one of the three radiation patterns illustrated [respectively referred to as pattern A), B) and C)].

The second line represented in FIG. 3 shows the radiation patterns which can be used by the system when the antennas emit or receive a signal with frequency $f_2$ (associated with the radio chain 2').

In this case it is possible to receive or transmit a signal with frequency $f_2$ according to two specific radiation patterns: A') and B').

Conveniently, the antennas are connected to the respective radio chains through an electronic selection circuit indicated by the reference number 4 in FIG. 1.

The electronic selection circuit 4 has a plurality of inputs 5 connected to the radio chains 2, 2' and one or more outputs 6 connected to the antennas 3.

In the example shown in the figure, the electronic selection circuit 4 has two inputs 5 (connected to the pair of radio chains 2, 2') and three outputs 6 (connected to the respective antennas 3).

The electronic selection circuit 6 is thus interposed between the radio chains 2, 2' and the antennas 3 and, as is better clarified further on in this description, its function is to control said antennas 3 in such a way as to select a corresponding radiation pattern among those available for a corresponding radio chain 2, 2'.

Preferably, the selection circuit 6 may comprise one or more switching elements 8 of the type described in the previous paragraphs; said switching elements are operatively connected to the antennas 3 and suited to selectively connect the latter with one or more radio chains 2, 2'.

Going back to the example of FIG. 1, the electronic selection circuit is suited to control the antennas 3 in such a way as to select a pattern among the radiation patterns A), B) or C) when a signal with frequency $f_1$ is applied to the same antennas 3, while it is suited to select a pattern between A') and B') when a signal with frequency $f_2$ is applied to the antennas 3.

The electronic selection circuit 4 can be configured to control the antennas 3 in such a way as to promote, for one or more of the latter, the simultaneous emission of corresponding electromagnetic signals suited to generate distinct radiation patterns (each associated with a corresponding electrical signal of the corresponding radio chains).

In other words, each radio chain 2, 2' can be associated, at the level of the antennas 3, with a corresponding radiation pattern (A-C; A' B') centred on the frequency $f_1$, $f_2$ associated with that specific radio chain 2, 2'.

Therefore, if the system comprises three radio chains (each centred on a respective frequency), the electronic selection device can be suited to control the antennas 3 in such a way as to promote the simultaneous emission of three distinct electromagnetic signals (and not of a single electromagnetic signal resulting from the mixing of the three signals coming from the radio chains).

Furthermore, each electromagnetic signal emitted will be centered on the single frequencies of the three radio chains, in such a way as to define a corresponding radiation pattern associated with the latter. These three radiation patterns, therefore, correspond to those selected by the electronic selection circuit 4 in that specific time instant.

Conveniently, the system 1 may comprise also a processing unit 7 operatively connected with the electronic selection circuit 4 and the antennas 3.

The processing unit 7 can assess the quality of the radio channel used to emit or receive the electromagnetic signal S associated with each radio chain 2, 2'.

The quality of the radio channel (commonly referred to also as radio link) can vary over time due to a plurality of factors which can modify the propagation of the electromagnetic signal emitted or received by the antennas 3 (for example, the introduction of obstacles, the reflections or activations to which the electromagnetic signal is subjected, the interference etc.).

The techniques for the assessment of the quality of the radio channel are known per se and the processing unit 7 can be suited to detect the signal transmitted and/or received by a single antenna 3 (or by a plurality of antennas) in such a way as to process the signal according to one or more of these techniques.

For example, the processing unit 7 can be suited to process the signal S received or transmitted by the antennas 3 in such a way as to:
- measure the power value of the signal received by one or more antennas 3 and associated with a respective radio chain 2, 2';
- evaluate the packet error rate associated with the communication link for each one of the respective frequencies $f_1$, $f_2$ related to one or more radio chains 2, 2';
- determine the modulation schemes associated with the transmission and/or reception of the data associated with the radio communication link of the respective frequencies $f_1$, $f_2$ related to one or more radio chains 2, 2';
- assess the capacity of the wireless channel associated with the radio communication link for each frequency $f_1$, $f_2$ related to one or more radio chains 2, 2'.

The expression "communication link" refers to the radio connection present between two receiver/transmitter devices.

These analyses provide information on the state of the channel; the electronic processing unit 7, if necessary, can be configured to carry out two or more processing cycles among those mentioned above, so as to correlate the results of the same and obtain even more precise information on the quality of the radio channel.

The processing unit 7 can be programmed in such a way as to assess the quality of the radio channel by selecting one radio chain 2, 2' at a time.

In particular, in a specific time instant the assessment of the channel quality can be selectively carried out when the antennas transmit or receive electromagnetic signals $s_1$, $s_2$ associated with the same radio chain 2, 2'.

In the example of FIG. 1, the processing unit 7 can be programmed to assess the quality of the channel related to the electromagnetic signals associated with the radio chain with frequency $f_1$, and only at the end of this assessment it will assess the radio channel related to the electromagnetic signals associated with the radio chain with frequency $f_2$.

To assess the radio channel associated with the signals $s_1$, $s_2$ generated and/or processed by a single radio chain 2, 2' (be it referred to the signals with frequency $f_1$ or to the signals with frequency $f_2$), the processing unit 7 can be configured to control the electronic selection circuit 4 in such a way as to sequentially assess the quality of the channel when the antennas 3 of the system are associated with the radiation patterns A), B), C); A'), B') provided for that specific radio chain 2, 2'.

For example, with reference to the radio chain with frequency $f_1$, the processing unit 7 assesses the radio channel in three distinct conditions: i) when the antennas 3 are associated with radiation pattern A), ii) when the antennas 3 are associated with radiation pattern B); iii) when the antennas 3 are associated with radiation pattern C).

Analogously, with reference to the radio chain with frequency $f_2$, the processing unit 7 assesses the radio channel when radiation patterns A') and B') are respectively associated with the antennas 3.

Following the assessment of the quality of the radio channel, the processing unit 7 can be configured to select the optimal radiation pattern to be associated with the antennas 3 to transmit electromagnetic signals related to a specific radio chain 2, 2' (that is, to a specific frequency $f_1$, $f_2$).

In general, the optimal radiation pattern is the pattern which guarantees the best quality of the channel.

For example, with reference to the radio chain 2 with frequency $f_1$, if after the assessment performed as described in the preceding paragraphs it is possible to ascertain that radiation pattern B) is the pattern which guarantees the best quality of the channel, the processing unit will be configured to apply this radiation pattern B) to the antennas 3 of the system 1.

According to a particular aspect of the invention, the selection of the radiation pattern associated with the signal $s_1$, $s_2$ generated by a specific radio chain 2, 2' varies according to the radiation pattern previously selected for the electrical signal associated with a different radio chain 2, 2'.

In other words, the selection of a radiation pattern associated with the transmission or reception of signals $s_2$ generated by a given radio chain 2' depends on the selection of the radiation pattern associated with the transmission or reception of signals $s_1$ associated with another radio chain 2.

In the example of FIG. 1 it is possible to highlight this aspect by stating that the selection of one of radiation patterns A') and B') depends on the selection concerning radiation patterns A), B), C) [and vice versa].

For example, the electronic processing unit 7 may inhibit the selection of radiation pattern A') if radiation pattern B) has been selected for the radio chain 2 with frequency $f_1$.

In other words, it is not always possible to select radiation pattern A') and this is excluded when pattern B) has been selected for the radio chain 2. In these conditions, therefore, radiation pattern B') will be the only pattern allowed for the radio chain with frequency $f_2$.

In this way a dependency is created among the radiation patterns which can be selected for the various radio chains of the device: in the example provided in this description, the selection of radiation pattern B) for the signals $s_1$ associated with the radio chain with frequency $f_1$ makes the selection of radiation pattern B') compulsory while preventing the possibility to select pattern A').

The selection of the optimal radiation pattern associated with the radio signals of a radio chain with predetermined frequency affects (that is, conditions) the selection of the radiation pattern associated with the radio signals of one or more of the remaining radio chains of the system.

The electronic selection circuit 4 can thus make a selection according to a scheme which inhibits one or more radiation patterns A-C; A', B' associated with the electrical signal $s_1$, $s_2$ of one or more radio chains 2, 2'.

The inhibition of one or more radiation patterns is actually conditional on a preceding selection step:

first of all, the radiation pattern associated with a predetermined radio chain is initially selected, after this first selection, for the remaining radio chains (or at least for one of them) the circuit 4 will follow a precise scheme for the selection of the radiation patterns, proceeding as described in the next paragraph.

In relation to these radio chains, in fact, the selection circuit will carry out the selection within a limited subset of radiation patterns (that is, will select a smaller number of radiation patterns compared to the originally available ones).

Therefore, the selection of a given radiation pattern associated with one of the radio chains 2, 2' excludes the selection of one or more radiation patterns associated with the remaining radio chains (or with at least one of them).

Consequently, the selection of the radiation patterns associated with the remaining radio chains can respect a combination of the univocal type: each radiation pattern A-C associated with a single radio chain 2 defines a precise relation with one or more radiation patterns B', C' of the remaining radio chains 2'.

In this way it is possible to design relatively simple and not cumbersome electronic selection circuits and processing units, which allow the production costs of the communication systems to be considerably reduced and the systems themselves to be miniaturized.

As already indicated above, the innovative characteristic of the present system lies in that it is possible to define a combination in the selection of the radiation patterns belonging to the various radio chains used in the system. More specifically, it will be possible to define a table of combinations suited to be stored in the processing unit; said table defines the possible combinations in the selection of the radiation patterns associated with the radio chains.

For example, in the case of the example illustrated in FIG. 1 the following table of combinations related to the radio chain 2 corresponding to frequency $f_1$ can be stored in the processing unit:

| Radio chain $f_1$ | A) | B) | C) |
|---|---|---|---|
| Radio chain $f_2$ | A'); B') | B') | A') |

In this case, if A) is the radiation pattern selected for the radio chain 2 associated with frequency $f_1$, with regard to the radio chain 2' associated with frequency $f_2$ it is possible to select pattern A' or B'). If, on the other hand, B) or C) is the radiation pattern selected for the radio chain 2 associated with frequency $f_1$, with regard to the radio chain 2' associated with frequency $f_2$ it is possible to select exclusively pattern B') or A').

In the same way, the following table of combinations related to the radio chain 2 corresponding to frequency $f_2$ can be stored in the memory of the processing unit:

| Radio chain $f_2$ | A') | B') |
|---|---|---|
| Radio chain $f_1$ | B) | A); C) |

In this case, if A') is the radiation pattern selected for the radio chain 2' associated with frequency $f_2$, with regard to the radio chain associated with frequency $f_1$ it is possible to select exclusively pattern B). If, on the other hand, B') is the radiation pattern selected for the radio chain 2' associated with frequency $f_2$, with regard to the radio chain associated with frequency $f_1$ it is possible to select one pattern between A) and C).

The subject of the present invention includes also a method for selecting a radiation pattern associated with one or more antennas of a communication system.

The communication system is of the type described above, that is, provided with a plurality of radio chains 2, 2' suited to generate respective electrical signals with a distinct and predetermined frequency $f_1$, $f_2$.

This method comprises a step a) of preparation of a plurality of sets of radiation patterns.

The number of these sets is equal to the number of radio chains 2, 2' used in the system and each of them is suited to contain a predetermined number of radiation patterns.

There is also a step b) of univocal association of each set with a corresponding radio chain 2, 2'.

With reference to the example of FIG. 1, it is possible to define the sets $I_1$, $I_2$ which can be associated with the respective pair of radio chains 2, 2'.

For example, the radiation patterns contained in these sets can be the following:

$$I_1 = [A; B; C]$$

$$I_2 = [A'; B']$$

where the letters A, B, C and A', B' indicate the radiation patterns illustrated in FIG. 2.

Sets of parameters P associated with the electromagnetic signal transmitted/received by the antennas are defined in step c).

These parameters P vary according to the real-time quality of the radio channel.

Knowing these parameters makes it possible to obtain precise information on the conditions of the radio channel used in that moment for the transmission/reception activity of the antennas 3 used in the radio communication system.

For example, the set of parameters P can be associated with the capacity of the channel of the wireless network and/or with the power value of the electromagnetic signal received by the antennas and/or with the packet error rate associated with the reception by the antennas and/or with the value of the modulation code scheme associated with the electromagnetic signal received by the antennas.

After step c) there is a step d) of determination of predetermined reference values associated with the set of parameters defined in said step c).

During the execution of step e), the set of parameters P defined in step c) is assessed. This step makes it possible to obtain sets of parameters P during the transmission or reception of the electromagnetic signal S by the antennas 3 according to a predetermined radiation pattern A-C; A', B' contained in the set $I_1$, $I_2$ corresponding to a respective radio chain 2, 2'.

Conveniently, the assessment carried out in step e) may possibly comprise the definition of a mathematical metric applicable to the set of parameters just assessed. The result obtained by applying said metric to the parameters P is a numerical factor which varies according to the value assumed by said assessed set of parameters.

The mathematical metric can be applied also to reference parameters, in such a way as to obtain respective reference numerical factors.

There is a step f) of execution of the previous assessment step e) for all the radiation patterns A-C; A', B' contained in the corresponding set $I_1$, $I_2$ associated with the predetermined radio chain 2, 2'.

Following said step f) it is possible to determine a plurality of sets of parameters P, each of which is associated with an analysis of the quality of the transmission channel carried out with reference to each radiation pattern A-C or B', C' present in the corresponding set $I_1$ or $I_2$ associated with the same radio chain 2 or 2'.

Step g) is the step of selection of the set of parameters P whose values are closest to the reference values defined in step d).

If in step e) a mathematical metric has been applied to the measured sets of parameters P, during the execution of step g) it is possible to make the selection based on the numerical factors whose value is closest to that of the reference numerical factors.

Successively, there is a step h) during which the antennas 3 of the corresponding radiation pattern A-C; A', B' are associated with the set of parameters P selected in step g).

This association is carried out exclusively for the radio chain 2, 2' assessed in step e).

For example, if the communication system comprises two radio chains 2, 2' suited to generate signals with different frequencies $f_1$, $f_2$, the steps e)-h) are first carried out for the set $I_1$, of radiation patterns A-C associated with frequency $f_1$ (so as to obtain the radiation pattern which optimizes the radio channel 2 associated with the transmission or reception of the electromagnetic signals S having the same frequency $f_1$) and the same steps e)-h) can be repeated only afterwards for the set $I_2$ containing the radiation patterns A', B' associated with frequency $f_2$.

The method also includes a step i) in which the antennas 3 are associated with a radiation pattern A-C; A', B' contained in one or more sets $I_1$, $I_2$ associated with a radio chain 2, 2' distinct from the radio chain assessed in step e) described above.

In other words, if steps e)-h) have been carried out on the set $I_1$ of radiation patterns A-C associated with the radio chain 2 with frequency $f_1$, during the execution of step i) a radiation pattern A', B' belonging to the set $I_2$ associated with the radio chain with frequency $f_2$ will be associated with the antennas 3.

The peculiar characteristic of the method lies in that the radiation patterns A', B' selected in step i) vary according to (or depend on) the radiation patterns A-C selected in step h).

In other words, steps h) and i) depend on each other; the selection of a given radiation pattern A-C associated with the radio chain 2 with frequency $f_1$ conditions the selection of a radiation pattern A', B' associated with the other radio chain (or the other radio chains) 2 with frequency $f_2$.

This aspect can be better understood by means of radiation pattern selection tables which can be used during the execution of steps h) and i) of the method.

For example, the following table indicates the combinations of radiation patterns related to the radio chain 2 corresponding to frequency $f_1$:

| Radio chain $f_1$ | A | B | C |
|---|---|---|---|
| Radio chain $f_2$ | A'; B' | B' | A' |

If the pattern selected in step h) corresponds to A, during the execution of step i) it is possible to select pattern A' or B'. In the case where step h) led to the selection of pattern B or C, during the execution of step i) it is possible to select exclusively pattern B' or A'. The following table indicates the combinations of radiation patterns related to the radio chain 2 corresponding to frequency $f_2$:

| Radio chain $f_2$ | A') | B) |
| Radio chain $f_1$ | B) | A); C) |

In this case, if step e) has been carried out on the radio chain with frequency $f_2$ and pattern A' has been selected in step h), during the execution of step i) it is possible to select exclusively pattern B. If, on the other hand, step e) led to the selection of pattern B', then in step i) it is possible to select one pattern between A and C.

The method may comprise a step l) of preparation of a plurality of subsets $S_1 \ldots S_4$ of radiation patterns A-C; A', B', each of which is included in a corresponding set $I_1$, $I_2$ defined in said step a).

For example, considering the example of FIG. 1, it is possible to suppose that there are the following four subsets:
$S_1$=[A];
$S_2$=[B, C];
$S_3$=[A']
$S_4$=[B']

In this case the subsets $S_1$ and $S_2$ are contained in the set $I_1$, while the subsets $S_3$ and $S_4$ are contained in the set $I_2$.

Successively, there can be a step m) in which one or more radiation patterns A -C; A', B' contained in a given set $I_1$ associated with a corresponding radio chain 2 (for example, that associated with frequency $f_1$) are associated with one or more subsets $S_2 \ldots S_4$ contained in the distinct set $I_2$ and associated with the other radio chains 2' (for example, that with frequency $f_2$).

Thanks to step m), it will thus be possible to establish a correlation between a given radiation pattern A-C; B', C' associated with a corresponding radio chain 2, 2' and subsets $S_1 \ldots S_4$ of the radiation patterns associated with the other radio chains 2', 2.

Going back to the example of FIG. 1, the possible associations between elements of a given set and the subsets contained in the remaining sets may be, for example, the following:

Set $I_1$
  Element A: associated with subsets $S_3$=[A'] and $S_4$=[B'];
  Element B: associated with subset $S_4$=[B'];
  Element C: associated with subset $S_3$=[A'];
Set $I_2$
  Element A': associated with subset $S_2$=[B];
  Element B': associated with subsets $S_1$=[A] and $S_3$=[C].

In this way, during the execution of step i), the radiation pattern selected for a radio chain 2, 2' different from that subjected to the assessment of the parameters (step e) will be selected exclusively from within the subset $S_1 \ldots S_4$ associated with the radiation pattern A-C; A', B' selected in step i) for the radio chain 2, 2' being assessed.

In order to obtain the above-mentioned selection, it is necessary that step m) of association of the individual radiation patterns A-C; A', B' with the various subsets $S_1 \ldots S_4$ be carried out before step e) of assessment of the parameters P associated with the signal S transmitted or received by the antennas 3.

This method may also comprise a step o) of definition of a further parameter P' associated with the real-time quantity of data traffic associated with the electromagnetic signal S emitted and/or received by the antennas 3.

Step o) can be followed by a step p) of measurement of said parameter P'; in this way step h) of association of the radiation pattern A-C; A', B' with the antennas 3 can also vary according to (or depend on) the value of the parameter P' associated with the real-time quantity of data traffic measured in step p).

The present invention can be carried out in other variants, all of which fall within the scope of the inventive characteristics claimed and described herein; said technical characteristics can be replaced by different technically equivalent elements and any materials, shapes and sizes can be used for the invention, provided that they are compatible with its intended use.

The reference numbers and signs included in the claims and in the description have the only purpose of making the text clearer and must not be considered as elements limiting the technical interpretation of the objects or processes they identify.

The invention claimed is:

1. A method for selecting a radiation pattern associated with one or more antennas of a communication system, wherein the communication system comprises a plurality of radio chains designed to generate respective electrical signals with a distinct and predetermined frequency, said method comprising the following steps:
   a) providing a plurality of sets of radiation patterns, each set of the plurality of sets being configured to contain a predetermined number of the radiation patterns;
   b) univocally associating each set with a corresponding radio chain;
   c) defining a set of parameters associated with an electromagnetic signal transmitted/received by said one or more antennas, said parameters being variable as a function of a real-time quality of a corresponding radio channel;
   d) determining predetermined reference values for the set of parameters defined in said step c);
   e) assessing the set of parameters defined in said step c), the set of parameters being obtained when said one or more antennas transmit/receive the electromagnetic signal with a predetermined radiation pattern contained in the set corresponding to a predetermined radio chain;
   f) executing the step e) of assessing the set of parameters of the step c) for each of the radiation patterns contained in the set corresponding to the predetermined radio chain so as to define a plurality of sets of parameters;
   g) selecting sets of parameters from the plurality of sets of parameters having values that are closest to the predetermined reference values defined in said step d);
   h) associating a first radiation pattern corresponding to the sets of parameters selected in said step g) and related to the predetermined radio chain assessed in said step e) with said one or more antennas; and
   i) associating a second radiation pattern contained in one or more of the sets associated with a radio chain of the plurality of radio chains distinct from the predetermined radio chain assessed in said step e) with said one or more antennas;
   wherein the second radiation pattern of said step i) is dependent on the radiation pattern of said step h) by having the first radiation pattern of said step h) condition a selection of the second radiation pattern of said step i).

2. The method as claimed in claim 1, further comprising a step l) of preparation of a plurality of subsets of radiation patterns, each contained in a corresponding set defined in said step a).

3. The method as claimed in claim 2, further comprising a step m) of associating one or more radiation patterns contained in a corresponding set associated with the predetermined radio chain with one or more subsets of radiation patterns contained in distinct sets associated another radio chain.

4. The method as claimed in claim 3, wherein said step m) of associating is executed before said step e).

5. The method as claimed in claim 3, wherein, during execution of said step h), one or more radiation patterns contained in the subsets defined in said step l) and associated with radio chains different from the predetermined radio chain assessed during execution of said step e) is/are associated with said one or more antennas.

6. The method as claimed in claim 1, wherein the set of parameters defined in said step c) is associated with a channel capacity of a wireless network, and/or with a power value of the electromagnetic signal received by said one or more antennas, and/or with a packet error rate associated with reception by said one or more antennas, and/or with a value of a modulation coding scheme associated with the electromagnetic signal received by said one or more antennas.

* * * * *